United States Patent Office 2,811,117
Patented Oct. 29, 1957

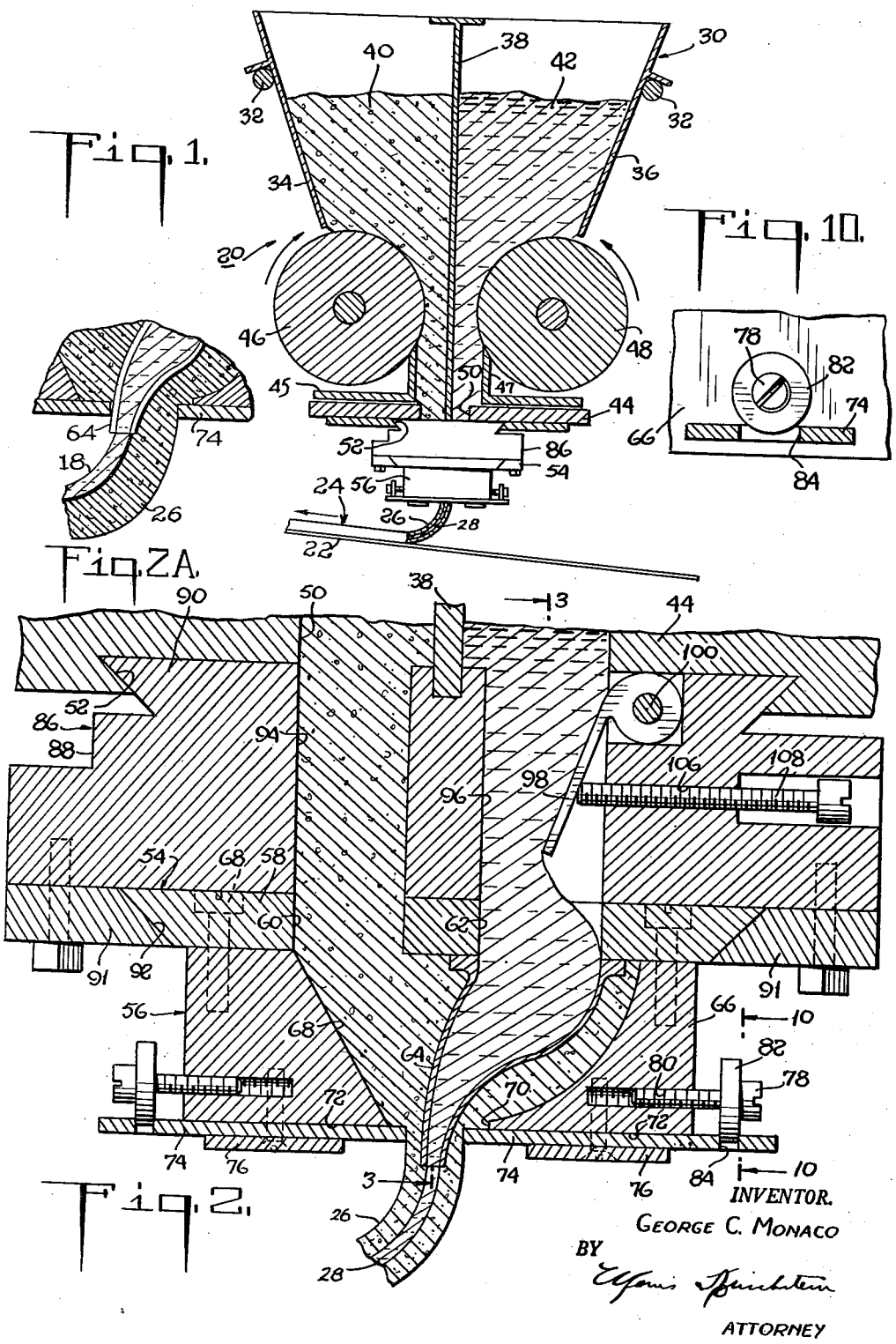

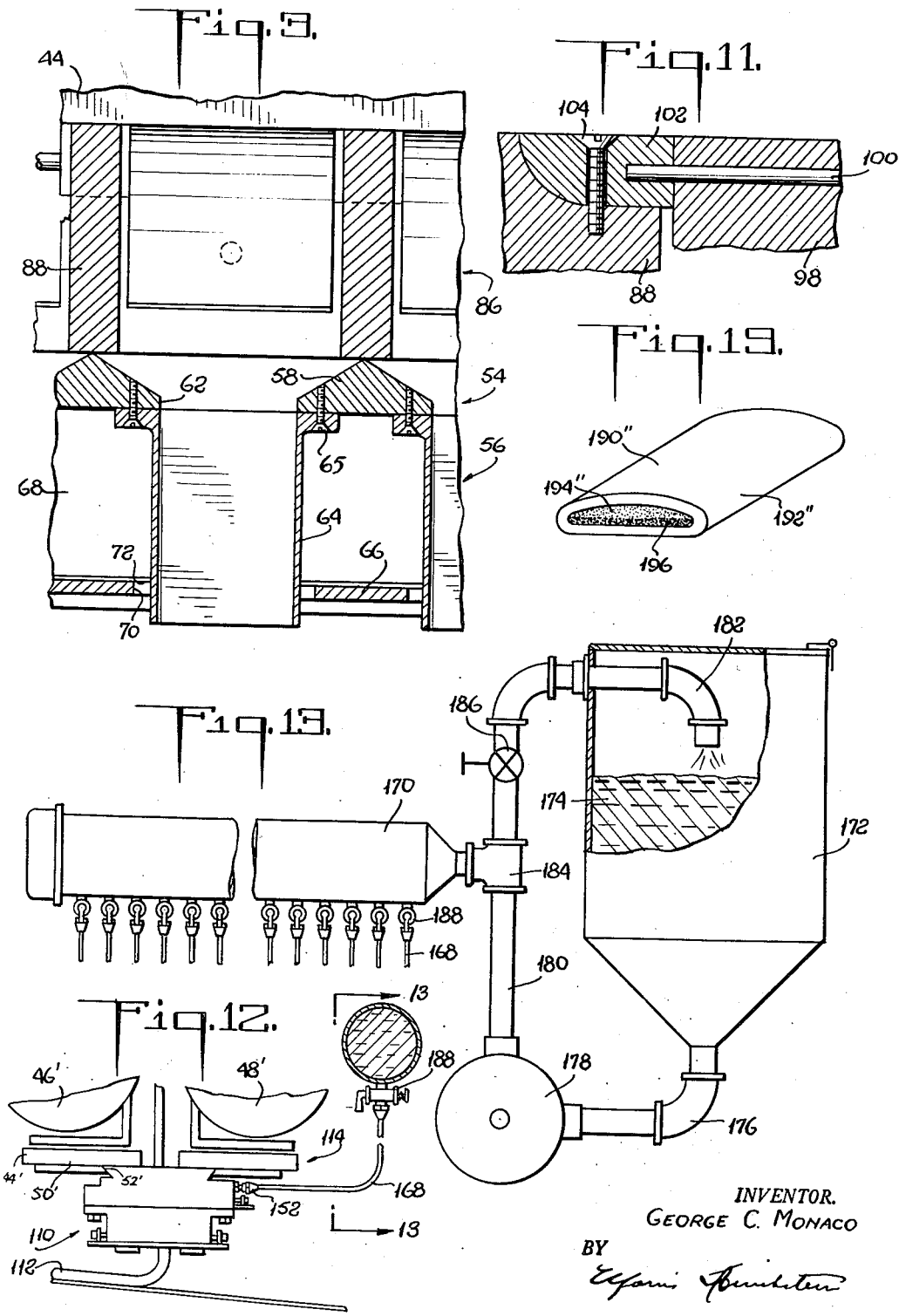

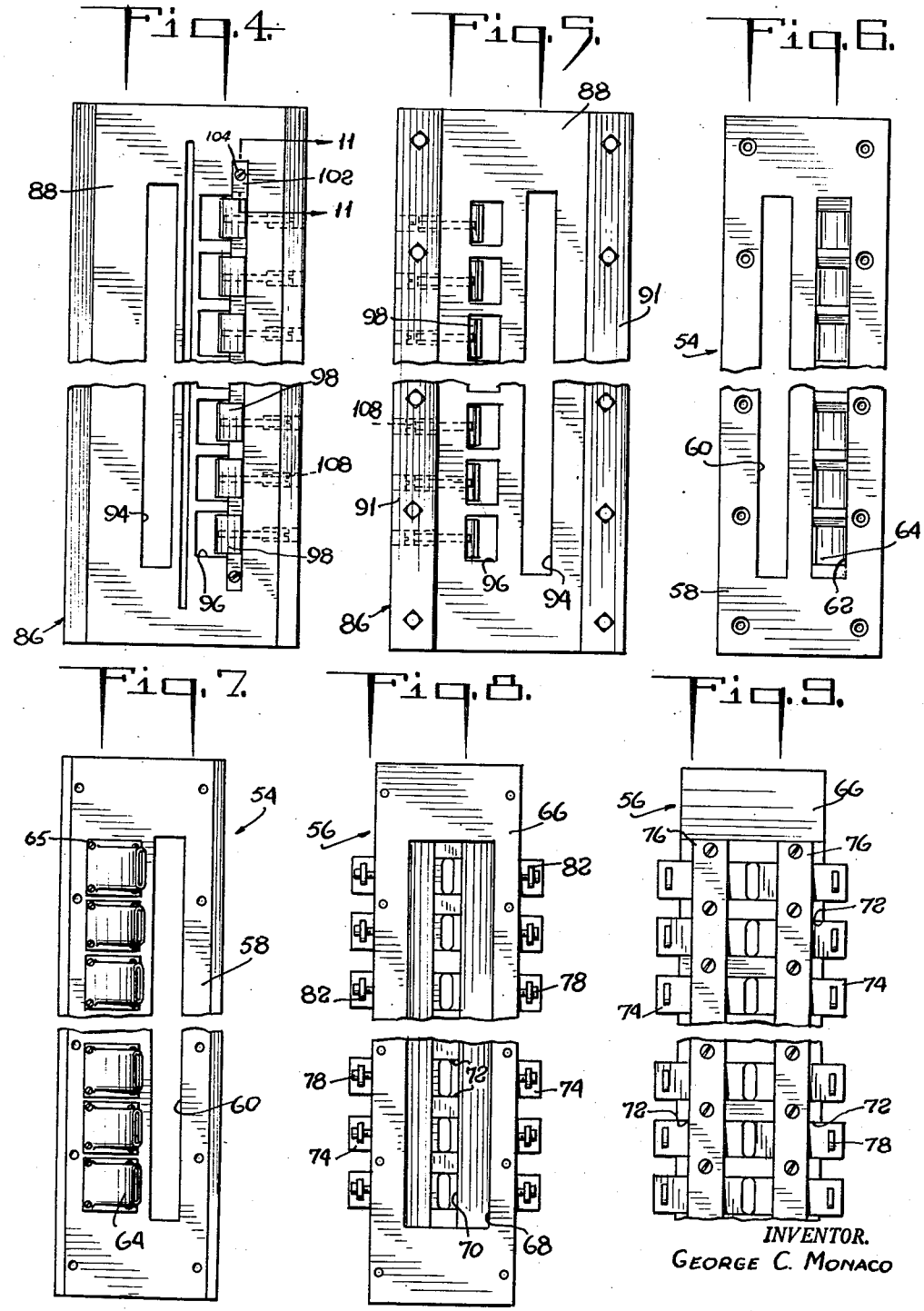

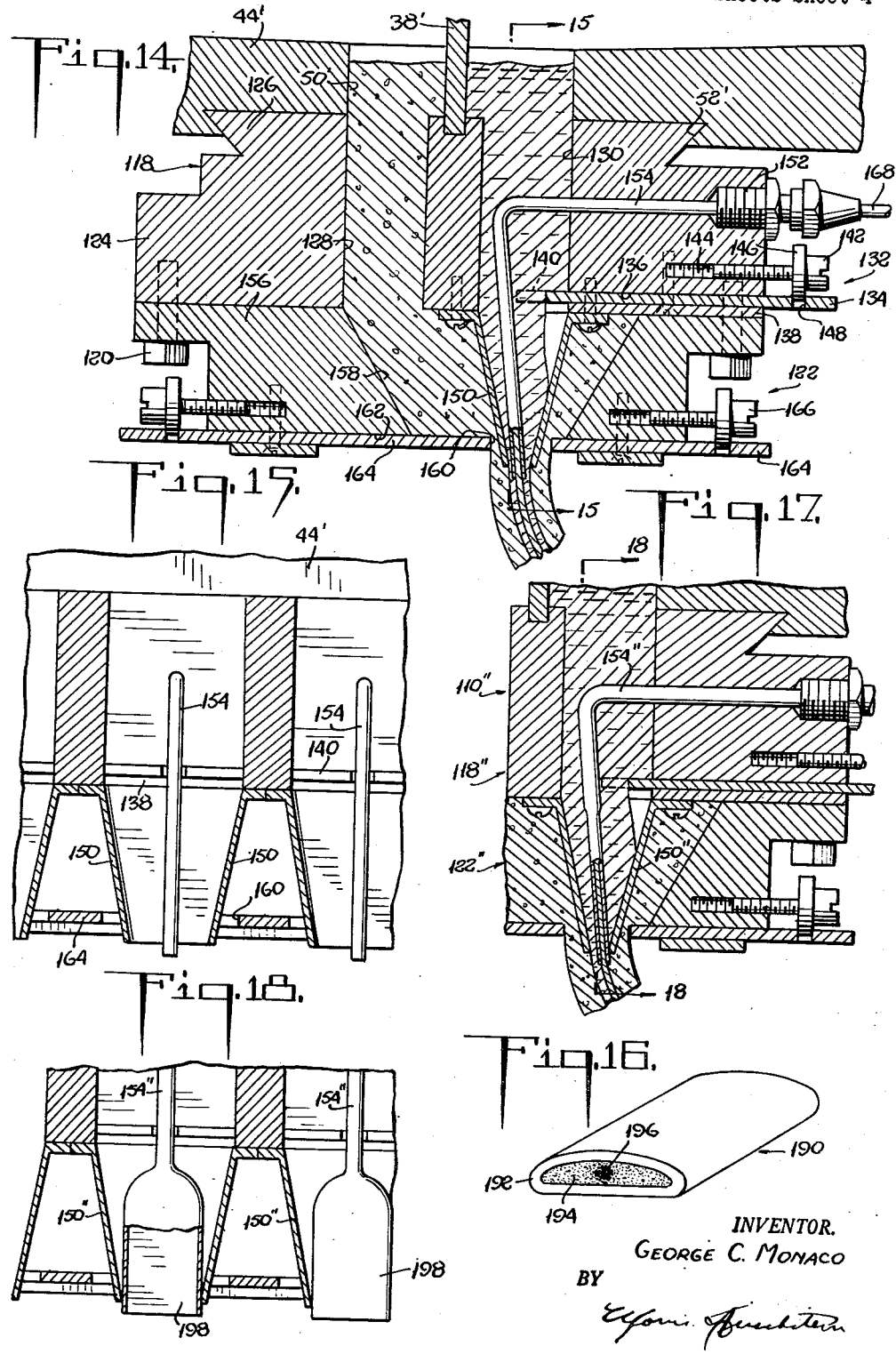

2,811,117

METHOD AND APPARATUS FOR MAKING A COMESTIBLE

George C. Monaco, New York, N. Y.

Application November 22, 1952, Serial No. 322,054

20 Claims. (Cl. 107—1)

This invention relates to a method and apparatus for making comestibles. More particularly my invention pertains to filled bars such for example as fig bars, coconut bars and peanut butter bars and to an extrusion machine and process for making the same.

Packaged filled bars are under the control of the Food and Drug Administration which specifies such packages shall bear an accurate statement of the net weight of the contents within a reasonable variation (Section 403(e) of the Federal Food, Drug and Cosmetic Act; and Regulation §118(e) of the Regulations of the Food and Drug Administration of the Federal Security Agency). However, the weight of filled bars varies quite markedly due to a variation in the cross-sectional area of the filling. Even when a large number of bars are made simultaneously in a single machine, e. g. twenty bars at a time, the ratio of filling to sheath (dough) changes drastically from bar to bar. Therefore, a manufacturer in order to comply with the statute and regulations must place enough filled bars in a package to ensure that, even for the lightest bars, sufficient bars are present at least to make up the printed weight. As a result a typical package is considerably overweight so that a manufacturer either must raise the price of the package or lose money.

It is an object of the present invention to provide filled bars of highly uniform weight per unit length and a method and process for manufacturing the same whereby a manufacturer is able to mark a package of such comestibles with the weight thereof and yet be certain that the weight will not fluctuate from package to package to such an extent as to either make the package unduly heavy or too light to comply with the statute and regulations.

It is another object of my invention to provide filled bars and a method and apparatus for making the same wherein an operator is able to closely regulate the proportion between the weights per unit length of the filling and the sheath.

It is another object of my invention to provide filled bars and a method and apparatus for making the same wherein an operator can independently vary the cross-sectional area of the filling and of the sheath.

It is another object of my invention to provide an attachment for a conventional extrusion apparatus for filled bars which will enable said apparatus to be manipulated so as to vary the cross-sectional area and the weight per unit length of the filling.

It is another object of my invention to provide filled bars and a method and apparatus for making the same wherein multiple fillings are employed, i. e. plural fillings extending longitudinal of the same bar.

It is another object of my invention to provide filled bars and a method and apparatus for making the same wherein plural fillings extend side by side in the same bar.

It is another object of my invention to provide filled bars and a method and apparatus for making the same wherein plural fillings are telescoped within one another in the same bar.

It is another object of my invention to provide an apparatus of the character described which constitutes relatively few and simple parts, is rugged and durable, and can be operated by comparatively unskilled help.

It is another object of my invention to provide an apparatus of the character described which is efficient, rapid and uniform in operation.

It is another object of my invention to provide an apparatus of the character described which can be readily adjusted to obtain any desired weight per unit length of filling and sheath.

Other objects of my invention will in part be obvious and in part will be pointed out hereinafter.

My invention accordingly consists in the articles, features of construction, combinations of elements, arrangements of parts and series of steps which will be exemplified in the bars, devices and methods hereinafter described and of which the scope of application will be indicated in the appended claims.

In the accompanying drawings in which are shown various possible embodiments of my invention, Fig. 1 is a side view in partial section of an extrusion filling apparatus constructed in accordance with my invention;

Fig. 2 is an enlarged transverse sectional view through the discharge throat of said apparatus;

Fig. 2A is a fragmentary view of the discharge throat of a modified form of my invention;

Fig. 3 is a sectional view taken substantially along the line 3—3 of Fig. 2;

Fig. 4 is a top view of the filling-valve plate;

Fig. 5 is a bottom view of said plate;

Fig. 6 is a top view of the filling-extrusion plate;

Fig. 7 is a bottom view of the filling-extrusion plate;

Fig. 8 is a top view of the sheath-extrusion-valve plate;

Fig. 9 is a bottom view of the sheath-extrusion-valve plate;

Fig. 10 is a sectional view taken substantially along the line 10—10 of Fig. 2, the same being illustrative of a detail of the sheath-extrusion-valve plate;

Fig. 11 is an enlarged sectional view taken substantially along the line 11—11 of Fig. 4, the same being illustrative of a detail of the filling-valve plate;

Fig. 12 is a view similar to Fig. 1, but to a reduced scale, of an extrusion filling apparatus embodying a modified form of my invention;

Fig. 13 is a view taken substantially along the line 13—13 of Fig. 12, and showing the distribution manifold, pump and source of filling for said apparatus of Fig. 12;

Fig. 14 is an enlarged transverse sectional view taken through the discharge throat of the apparatus illustrated in Fig. 12;

Fig. 15 is a sectional view taken substantially along the line 15—15 of Fig. 14;

Fig. 16 is a perspective view of a filled bar made in the apparatus of Fig. 14;

Fig. 17 is a view similar to Fig. 14 of an apparatus embodying another modified form of my invention;

Fig. 18 is a sectional view taken substantially along the line 18—18 of Fig. 17; and Fig. 19 is a perspective view of a filled bar made in the apparatus of Fig. 17.

Referring now in detail to the drawings, and more particularly to Figs. 1–11, the reference numeral 20 illustrates an apparatus embodying the present invention and adapted to deposit on an endless conveyor belt 22 an extruded unbaked bar 24 consisting of two portions 26, 28, one of which, 26, usually is dough and is on the outside, and the other of which, 28, usually is material of the type known in the trade as a filling. In one form of bar said first portion, as is well known to the art, may completely cover the bottom, top and sides of the second portion; and in another form of bar (manufactured in the apparatus shown in Fig. 2A) the entire top of the first portion is missing. To simplify the description, the first portion hereinafter always will be referred to as a sheath; but it will be understood from the foregoing that the sheath does not necessarily have to cover the top and sides of the filling.

Certain portions of the apparatus 20 are conventional and others have been provided in accordance with the instant invention. However, for simplicity of explanation, the entire apparatus will be described and the new portions will be appropriately identified.

Said apparatus 20 includes a dual compartment hopper 30, the hopper 30 having downwardly converging front and back walls 34, 36 supported on cross-rods 32. The hopper also includes a central dividing partition 38. Dough 40 located in the front of the partition forms the sheath 26 and jam or the like 42 disposed in back of the partition forms the filling.

The bottom of the hopper constitutes a feed plate 44 on which a pair of spaced scraper plates 45 are slidable toward and away from the partition 38. Each scraper plate carries a vertical doctor blade 47. Two feed rolls 46, 48 are provided, one feed roll contacting one of the doctor blades and the bottom edge of one of the hopper walls, e. g. the wall 34, and the other feed roll contacting the other doctor blade and the bottom edge of the other hopper wall.

Suitable means (not shown) rotates the two rolls in opposite directions thereby feeding dough and filling material downwardly on opposite sides of the partition. The feed plate includes a feed opening 50 beneath and extending parallel to the rolls and longitudinally divided by the partition. The bottom of the feed plate conventionally includes a dovetailed groove 52 longitudinally centered on the feed opening.

Heretofore dough and filling material forced through the feed opening has been led immediately to a combination filling-extrusion plate 54 and a sheath-extrusion-valve plate 56. These two plates still are employed in an apparatus embodying my invention although the same are not, as heretofore, directly connected to the feed plate 44.

Referring to Figs. 2, 3, 6 and 7, the filling-extrusion plate 52 comprises a long, thin, broad, flat metallic body 58 having chamfered sides. The width and chamfer of the body 58 is such that it fits the dovetailed groove 52, this merely being an incident to the practice of my invention inasmuch as heretofore said body actually has been disposed in the groove during normal manufacturing use. The body 58 is formed with a longitudinal dough slot 60 aligned with the portion of the feed opening 50 on the dough side of the partition 38. In addition the body 58 includes a row of filling apertures 62 aligned with the portion of the feed opening on the filling material side of the partition. A plurality of downwardly extending extrusion nozzles 64 are suitably secured, as by screws 65, to the underside of the body 58 beneath the apertures 62, there being one such nozzle for each aperture.

The sheath-extrusion-valve plate 56 comprises a block 66 which is held against the bottom surface of the plate 54 in some suitable manner, as for example, by screws 68. Said block 66 has a long trough 68 which is approximately aligned with the feed opening 50. Hence the trough will receive and will be filled with dough entering the same through the slot 60. The nozzles 64 extend through said trough and obviously no dough will be located therein. The trough 68 tapers to a row of dough-discharge openings 70 through which the tips of the nozzles 64 protrude.

The bottom surface of the block 66 is cut out to provide pairs of transverse grooves 72 extending inwardly from both sides of the block, each pair of grooves being associated with, having the same width as, and terminating at a different dough-discharge opening 70.

A pair of valve strips 74 are located in each pair of grooves 72, one valve strip being disposed on one side of the associated opening 70 and the other on the other side. The tips of the valve strips are adapted to jut into the openings 70 so that by varying the positions of said strips one may vary the effective size of the associated dough-discharge opening. The strips are held in position by underlying metal slats 76.

To readily vary the positions of the valve strips suitable means is provided, such, for example, as bolts 78 received in tapped bores 80 in the block 66. Each bolt is formed with a wide collar 82 that turns in a slot 84 in the associated valve.

The tips of the strips are suitably shaped to form the dough extruded from the dough-discharge openings in to some desired cross-sectional configuration.

It will be appreciated that by shifting the valve strips with the aforesaid means, the amount of dough extruded per unit length of the bar can be set individually for each dough-discharge opening and can be located in any desired manner with respect to the extruded ribbon of filling material.

However, heretofore when these two plates 54, 56 were assembled, they were attached directly to the feed plate 44 so that although the amount of dough could be controlled closely, the amount of filling material could not. Hence, pursuant to my invention the combined plates 54, 56 are detached from the feed plate 44 and there is inserted between the feed plate and said combined plates 54, 56 a filling-valve plate 86 (Figs. 2, 3, 4, 5 and 11) embodying my invention.

As thus far described the construction of the apparatus 20 is known in the art. However, the plate 86, now about to be described and the apparatus 20 when modified to include said plate, is both new in structure and function and produces a highly uniform filled bar.

The plate 86 includes a block 88 having a dovetail 90 adapted to be fitted into the groove 52. The bottom of the block 88 is provided with a pair of clamping strips 91 which, with the block 88, define a second dovetailed groove 92 adapted to receive the chamfered edges of the plate 54. Said block 90 includes a through slot 94 which is in alignment with the dough slot 60 and with the portion of the feed opening 50 on the dough side of the partition 38. Thus the slot 94 simply passes dough from said feed opening to the dough-discharge openings 70.

The block 88 further includes a plurality of apertures 96, each aperture being directly above an aperture 62 in the plate 54. Thus said apertures 96 are in a row and directly beneath the portion of the feed opening 50 on the filling side of the partition 38. Said apertures 96 lead filling material discharged from the feed plate to the extrusion nozzles 64.

A valve means is associated with each of the apertures 96, said valve means being such that it may be adjusted independently of all the other valve means in the plate 86. I have shown herein a typical simple valve construction which can be made with ease and readily cleaned at the end of each day's operation. However, it will be understood that this particular construction merely is exemplative and is not to be taken as limitative.

The valve means includes a flap valve 98 mounted to turn on a shaft 100. Optionally said shaft serves as a common pivot point for all of the flap valves and for this purpose the shaft runs the length of all the openings 96 and has its ends journalled in plugs 102 that detachably are secured, as by screws 104, in recesses in the top of the block 88. In this manner, simply by detaching the screws, all of the flap valves can be lifted clear of the block for cleaning.

A transverse tapped bore 106 is provided in the block 88 in back of each flap valve 98. Said bore threadedly receives a bolt 108 whose head is accessible from the outside of the block. Turning the bolt adjusts the position of the flap valve, it being observed that the valves are held against the tips of the bolts by the pressure of the filling material passing through the apertures 96.

With this arrangement I am able to vary selectively the flow of filling material through each of the extrusion nozzles individually so that the weight per unit length of the filling material of each filled bar can be controlled by the operator. Accordingly, the weight per unit length of filling material, as well as of the sheath, can be made identical for all of the many filled bars simultaneously extruded by the apparatus so that, after baking, an exact number of bars can be placed in a package to obtain a predetermined weight which is marked on the package pursuant to regulations of the Food and Drug Administration.

Although I have described the apparatus 20 as a conventional filled bar extrusion machine which has been modified by the addition of the plate 86 so that individual regulation of the filling material for each bar can be obtained, it will be understood that, if desired, such regulation can be built into the apparatus initially.

Referring now to Figs. 12–16, the reference numeral 110 denotes an extrusion apparatus essentially similar to the apparatus 20 save that the apparatus 110 is arranged to extrude two fillings simultaneously inside of a single sheath.

The apparatus 110 constitutes a hopper 114 with feed rolls 46′, 48′ and a feed plate 44′ which are identical to those of the apparatus 20 and hence will be identified by the same numerals primed but will not be described in detail. A dovetailed groove 52′ receives a filling-extrusion-valve plate 118. Removably secured to the undersurface of this plate, as by a bolt 120, is a sheath-extrusion-valve plate 122.

The filling-extrusion-valve plate 118 comprises a block 124 having a dovetail 126 fitted in the groove 52′. Said block includes a through slot 128 in alignment with the portion of the feed opening 50′ on the dough side of the partition 38′. The block further includes a plurality of filling material apertures 130 in a row beneath the portion of the feed opening 50′ on the filling side of the partition 38′.

A valve 132 is associated with each of the apertures 130, each said valve being adjustable independently of all the other valves. The valves shown herein are illustrated by way of example. Said valves comprise a single strip 134 for each aperture 130. Said strip is received in a groove 136 extending transversely away from said aperture and held in place by a longitudinally extending slat 138. Thus the strip is held with its tip 140 variably located within the aperture 130. To shift the strip I employ a bolt 142 whose threaded shank is screwed into a transversely extending tapped bore 144 in the block 124. The bolt is formed with a wide collar 146 rotatable in a slot 148 in the strip 134. Thus by turning the bolt 142 one is able to vary the amount of filling material flowing through the aperture 130.

Further the plate 118 includes a plurality of extrusion nozzles 150 secured, as by screws, to the undersurface of the block 118 and projecting downwardly from the same, there being one nozzle for each of the apertures 130.

Finally, the block carries a plurality of couplings 152 which engage tubes 154 extending transversely within the block from the side face thereof to the apertures 130, there being one tube associated with each aperture 130. Each tube turns down in the aperture and extends toward the bottom of the associated nozzle 150 preferably protruding slightly from the tip thereof. The tip of the tube is so shaped that it is clear of the tip of the nozzle thereby permitting filling material to flow from the nozzle around the end of the tube.

It may be pointed out that, save for the provision of the tubes 154 and couplings 152 the sheath-extrusion-valve plate 118 constitutes, in effect, a combination of the plates 54, 86 of the apparatus 20 and represents an optional alternative construction for said apparatus.

The sheath-extrusion-valve plate 122 comprises a block 156 having a long trough 158 which is positioned to accommodate the nozzles 150 and to receive dough forced through the slot 128. The trough 158 tapers to a row of dough discharge openings 160 through which the tips of the nozzles 150 project. The bottom surface of the block it cut out to form pairs of transverse grooves 162 extending to the discharge openings 160 from both sides of the block. A pair of valve strips 164 associated with each pair of grooves and on opposite sides of the block have their tips extending into the openings 160. The valve strips are slidable so as to vary selectively the effective area of the dough openings, as for example by having the strips under the control of bolts 166 that function in a manner similar to the bolts 142.

The couplings 152 are connected by individual conduits 168 (Figs. 12 and 13) to a manifold 170.

A receptacle 172 contains a supply 174 of a suitable filling material different from the material in the filling material side of the hopper 114. For example, the hopper may contain coconut filling and the receptacle 172 may contain jam or the like. A conduit 176 leads from the bottom of the receptacle 172 to the inlet of a pump 178 whose outlet discharges to a vertical header 180 which leads the filling material 174 back to the receptacle 172 through a return 182, whereby continuous recirculation of the filling material 174 is assured. The header is interrupted by a T 184 whose lateral outlet is connected to the inlet of the manifold 170. A valve 186 is inserted in the header between the T and the return. Thus by regulating the valve the degree of pressure in the manifold can be set to any desired value. In addition I provide a cock 188 in each of the conduits 168 thereby to enable individual regulation of the pressure in each of the tubes 154.

It now will be apparent that for each of the filled bars extruded by the apparatus 110, I can independently regulate the weight of dough per unit length and the weight of each of the fillings per unit length, the weight of the dough being regulated by the bolts 166, the weight of the filling from the hopper being regulated by the bolts 142, and the weight of the filling from the receptacle 172 being regulated by the valve 186 and the individual cocks 188.

In Fig. 16 I have shown a perspective view of a section of a filled bar 190 extruded by the apparatus 110. Said bar includes a dough sheath 192 which is conventional but which instead of the usual single filling includes two fillings 194, 196, each of which runs the length of the bar. The filling 196 is within the filling 194 and the filling 194 is within the sheath 192. Although in the form of filled bar just described the innermost filling 196 is out of contact with the sheath, it will be understood that, if desired, the diameter of said innermost filling can be increased or the height of the sheath decreased so that this filling touches the sheath and divides the filling material 194 in half longitudinally of the body.

Still another form of extrusion apparatus 110″ is illustrated in Figs. 17 and 18. Said apparatus 110″ is essentially similar to the apparatus 110. Identical parts will be referred to by the same reference numerals double primed. The apparatus 110″ includes plates 118″ and 122″ which are exactly the same as the plates 118, 122 except for the shape and position of the free ends 198 of the tubes 154″. In the apparatus 110″ the tips of the tubes 154″ instead of being round are flat and elongated and one broad side of the tip touches the juxtaposed side of the nozzle 150″. Hence the filled bar 190″ (Fig. 19) extruded by the apparatus 110″ will have a sheath 192″ in which the fillings 194″ and 196″ are coextensive and side by side rather than being one within the other as in the bar 190.

It thus will be seen that I have provided articles, devices and methods which achieve all the objects of my invention and are well adapted to meet the conditions of practical use.

As various possible embodiments might be made of the above invention, and as various changes might be made in the embodiments above set forth, it is to be understood that all matter herein described, or shown in the accompanying drawings, is to be interpreted as illustrative and not in a limiting sense.

Having thus described my invention, I claim as new and desire to secure by Letters Patent:

1. In an apparatus for simultaneously continuously extruding several continuous filled comestible strips which can be cut into bars: means for continuously feeding dough, means for continuously feeding filling material, means providing a plurality of dough openings, means connecting the dough feeding means to the dough openings whereby dough is extruded through the dough openings, means providing a plurality of filling material openings contiguous with and discharging in the same direction as the dough openings, means connecting the filling material feeding means to the filling material openings whereby filling material is extruded through the filling material openings in contact with the extruded dough, means to individually vary the flow of dough through each of the dough openings, and means to individually vary the flow of filling material through each of the filling material openings.

2. In an apparatus of the character described for simultaneously continuously extruding several continuous filled comestible strips which can be cut into bars, and which includes means for continuously feeding dough and means for continuously feeding filling material: the combination of means providing a plurality of dough openings, means connecting the dough feeding means to the dough openings whereby dough is extruded through the dough openings, means providing a plurality of filling material openings contiguous with and discharging in the same direction as the dough openings, means connecting the filling material feeding means to the filling material openings whereby filling material is extruded through the filling material openings in contact with the extruded dough, means to individually vary the flow of dough through each of the dough openings, and means to individually vary the flow of filling material through each of the filling material openings.

3. In an apparatus for simultaneously continuously extruding several continuous filled comestible strips which can be cut into bars: means for continuously feeding dough, means for continuously feeding filling material, means providing a plurality of dough openings, means connecting the dough feeding means to the dough openings whereby dough is extruded through the dough openings, means providing a plurality of filling material openings contiguous with and discharging in the same direction as the dough openings, a member having a plurality of apertures connecting the filling material feeding means with the filling material openings, means to individually vary the flow of dough through each of the dough openings, and valve means to individually vary the flow of filling material through each of said apertures.

4. In an apparatus of the character described for simultaneously continuously extruding several continuous filled comestible strips which can be cut into bars, and which includes means for continuously feeding dough and means for continuously feeding filling material: the combination of, means providing a plurality of dough openings, means connecting the dough feeding means to the dough openings whereby dough is extruded through the dough openings, means providing a plurality of filling material openings contiguous with and discharging in the same direction as the dough openings, a member having a plurality of apertures connecting the filling material feeding means with the filling material openings whereby filling material is extruded through the filling material openings in contact with the extruded dough, means to individually vary the flow of dough through each of the dough openings, and valve means to individually vary the flow of filling material through each of said apertures.

5. In an apparatus of the character described for simultaneously continuously extruding several continuous filled comestible strips which can be cut into bars, wherein dough is extruded continuously through a plurality of dough openings and wherein means is provided to individually vary the flow of dough through each of said openings: the combination of, means for continuously feeding filling material, means providing a plurality of filling material openings contiguous with and discharging in the same direction as the dough openings, means connecting the filling material feeding means to the filling material openings whereby filling material is extruded through the filling material openings in contact with the extruded dough, and means to individually vary the flow of filling material through each of the filling material openings.

6. In an apparatus of the character described for simultaneously continuously extruding several continuous filled comestible strips which can be cut into bars, wherein dough is extruded continuously through a plurality of dough openings, and wherein there are provided means to individually vary the flow of dough through each of said openings and means for continuously feeding filling material: the combination of, means providing a plurality of filling material opening contiguous with and discharging in the same direction as the dough openings, means connecting the filling material feeding means to the filling material openings whereby filling material is extruded through the filling material openings in contact with the extruded dough, and means to individually vary the flow of filling material through each of the filling material openings.

7. In an apparatus of the character described for simultaneously continuously extruding several continuous filled comestible strips which can be cut into bars, wherein dough is extruded continuously through a plurality of dough openings, and wherein there are provided means to individually vary the flow of dough through each of said openings and means for continuously feeding filling material: the combination of, a plurality of discharge nozzles the tips whereof are contiguous with and discharge in the same direction as the dough openings, means connecting the filling material feeding means to the discharge nozzles whereby filling material is extruded through the discharge nozzles in contact with the extruded dough, and valves to individually vary the flow of filling material through each of the discharge nozzles.

8. In an apparatus of the character described for simultaneously continuously extruding several continuous filled comestible strips which can be cut into bars, wherein dough is extruded continuously through a plurality of dough openings, and wherein there are provided means to individually vary the flow of dough through each of said openings and means for continuously feeding filling material: the combination of, means providing a plurality of filling material openings within the dough openings, means connecting the filling material feeding means to the filling material openings whereby filling material is extruded through the filling material openings in contact with the extruded dough, and means to individually vary the flow of filling material through each of the filling material openings.

9. In an apparatus of the character described for simultaneously continuously extruding several continuous filled comestible strips which can be cut into bars, wherein dough is extruded continuously through a plurality of dough openings by individually variable means and wherein filling material is extruded continuously through a plurality of filling material openings in contact with the extruded dough: a plurality of valves connected to individually vary the flow of filling material through each of the filling openings.

10. In an apparatus of the character described for simultaneously continuously extruding several continuous filled comestible strips which can be cut into bars, wherein dough is extruded continuously through a plurality of dough openings by individually variable means and wherein filling material is extruded continuously through a plurality of filling material openings in contact with the extruded dough: a block having a plurality of valves arranged to individually vary the flow of filling material through each of the filling material openings.

11. In an apparatus of the character described having feeding means with a discharge opening for dough and filling material, a filling material-extrusion plate, and a dough-extrusion-valve plate: a filling material-valve plate intermediate the discharge opening and the filling material-extrusion plate.

12. A machine of the character described comprising a dough-filling material feeding means having a discharge opening, a filling material-extrusion-valve plate beneath said opening, and a dough-extrusion-valve plate beneath said filling material-extrusion-valve plate, said filling material-extrusion-valve plate having an opening for the passage of dough from the discharge opening to the dough-extrusion-valve plate.

13. An attachment for a filled bar extrusion apparatus including a feed means having a discharge opening for dough and filling material, a filling material-extrusion plate having a row of apertures each of which has a discharge nozzle beneath it carried by the plate, and a dough-extrusion-valve plate: said attachment comprising a block adapted to be inserted between the discharge opening and the filling material-extrusion plate, said block having a plurality of apertures adapted to be aligned with the apertures in the filling material-extrusion plate, and a plurality of valves, each of said valves being individually adjustable and associated with a different one of the apertures in the block.

14. An apparatus of the character described comprising a partitioned hopper adapted to contain dough on one side of the partition and filling material on the other, said hopper including a dough feeding roll and a filling material feeding roll, means providing a plurality of dough openings, means connecting the discharge from the dough feed roll to the dough openings whereby dough is extruded through the dough openings, a plurality of discharge nozzles for filling material, the tips of said nozzles being contiguous with the dough openings, means connecting said nozzles to the filling material feeding roll whereby filling material is extruded through the discharge nozzles in contact with the extruded dough, a source of a second filling material, a pump having an inlet connected to said source, a manifold, said pump having an outlet connected to said manifold, and a plurality of tubes extending from the manifold, each of said tubes terminating within a different discharge nozzle adjacent a tip thereof.

15. An apparatus as set forth in claim 14 wherein the tip of each tube is spaced from the tip of the associated nozzle.

16. An apparatus as set forth in claim 14 wherein the tip of each tube touches the tip of the associated nozzle.

17. An apparatus as set forth in claim 16 wherein the tip of each tube constitutes an elongated opening, wherein the tip of each discharge nozzle is elongated, and wherein an elongated side of the tip of each tube touches a long side of the associated nozzle.

18. A method of simultaneously continuously extruding several filled comestible strips which can be cut into bars, said method comprising continuously extruding dough through plural dough openings, individually varying the flow of dough through each of said openings, continuously extruding filling material through plural filling material openings contiguous with and discharging in the same direction as the dough openings, and individually varying the flow of filling materials through each of said filling material openings.

19. In a method of simultaneously continuously extruding several filled comestible strips which can be cut into bars wherein dough is extruded through plural dough openings, filling material is extruded through plural filling material openings continuous with and discharging in the same direction as the dough openings, and the flow of dough through each of said dough openings is individually varied: that improvement comprising individually varying the flow of filling material through each of said filling material openings.

20. In an apparatus for simultaneously continuously extruding several continuous filled comestible strips which can be cut into bars: means for continuously feeding dough, a first means for continuously feeding filling material, a second means for continuously feeding filling material, means providing a plurality of dough openings, means connecting the dough feeding means to the dough openings whereby dough is extruded through the dough openings, means providing a first set of filling material openings contiguous with the dough openings, means providing a second set of filling material openings contiguous with the first set of filling material openings, means connecting the first filling material feeding means to the first set of filling material openings whereby the first filling material is extruded through the first set of filling material openings in contact with the extruded dough, means connecting the second filling material feeding means with the second set of filling material openings whereby the second filling material is extruded through the second set of filling material openings in contact with the filling material extruded through the first set of filling material openings, means to individually vary the flow of dough through each of the dough openings, means to individually vary the flow of filling material through each of the openings of the first set of filling material openings, and means to individually vary the flow of filling material through each of the openings of the second set of filling material openings.

References Cited in the file of this patent

UNITED STATES PATENTS

| | | |
|---|---|---|
| 466,854 | Mitchell | Jan. 12, 1892 |
| 516,648 | Harton | Mar. 20, 1894 |
| 660,717 | Barber et al. | Oct. 30, 1900 |
| 1,107,184 | Priban | Aug. 11, 1914 |
| 1,303,599 | Salerno | May 13, 1919 |
| 1,404,548 | Salerno | Jan. 24, 1922 |
| 1,507,516 | Richardson | Sept. 2, 1924 |
| 1,664,337 | Vanderput | Mar. 27, 1928 |
| 2,092,160 | Hawerlander | Sept. 7, 1937 |
| 2,249,311 | Johnston et al. | July 15, 1941 |
| 2,298,278 | Clark | Oct. 13, 1942 |
| 2,303,351 | Gage et al. | Dec. 1, 1942 |

FOREIGN PATENTS

| | | |
|---|---|---|
| 6,818 | Great Britain | Apr. 1, 1893 |
| 462,156 | Great Britain | Mar. 3, 1937 |